(12) United States Patent
Tsuchiya

(10) Patent No.: US 11,174,803 B2
(45) Date of Patent: Nov. 16, 2021

(54) INTERNAL COMBUSTION ENGINE CONTROL METHOD AND INTERNAL COMBUSTION ENGINE CONTROL DEVICE

(71) Applicant: Nissan Motor Co., Ltd., Kanagawa (JP)

(72) Inventor: Terumasa Tsuchiya, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 44 days.

(21) Appl. No.: 16/652,602

(22) PCT Filed: Oct. 2, 2017

(86) PCT No.: PCT/JP2017/035776
§ 371 (c)(1),
(2) Date: Mar. 31, 2020

(87) PCT Pub. No.: WO2019/069345
PCT Pub. Date: Apr. 11, 2019

(65) Prior Publication Data
US 2020/0240341 A1 Jul. 30, 2020

(51) Int. Cl.
*F02N 11/08* (2006.01)
*F02D 41/06* (2006.01)
(Continued)

(52) U.S. Cl.
CPC ............ *F02D 41/065* (2013.01); *B60K 17/02* (2013.01); *B60K 17/04* (2013.01); *F02D 41/401* (2013.01);
(Continued)

(58) Field of Classification Search
CPC ................ F02D 41/065; F02D 41/401; F02D 2200/101; F02D 2200/602; B60K 17/02;
(Continued)

(56) References Cited

U.S. PATENT DOCUMENTS 9,039,570 B2 * 5/2015 Doering .............. B60W 10/023
477/86
9,764,726 B2 * 9/2017 Gibson ................. B60W 10/06
(Continued)

FOREIGN PATENT DOCUMENTS

JP 2010-223006 A 10/2010
JP 2011-213181 A 10/2011
(Continued)

*Primary Examiner* — Hai H Huynh
(74) *Attorney, Agent, or Firm* — Osha Bergman Watanabe & Burton LLP

(57) ABSTRACT

In the case of restarting an internal combustion engine that has been automatically stopped during running, the internal combustion engine is restarted by combustion recovery starting when the rotation speed of the internal combustion engine under the input of a restart request is greater than or equal to a predetermined first rotation speed. In the case of restarting the internal combustion engine that has been automatically stopped during running, the internal combustion engine is restarted by cranking recovery starting when the rotation speed of the internal combustion engine under the input of the restart request is lower than the predetermined first rotation speed. The first rotation speed is set lower at the restart of the internal combustion engine in a sailing stop state than at the restart of the internal combustion engine in a coast stop state.

4 Claims, 3 Drawing Sheets

(51) Int. Cl.
  *B60K 17/02* (2006.01)
  *B60K 17/04* (2006.01)
  *F02D 41/40* (2006.01)

(52) U.S. Cl.
  CPC .... *F02N 11/0803* (2013.01); *F02D 2200/101* (2013.01); *F02D 2200/602* (2013.01); *F02N 2200/101* (2013.01); *F02N 2200/102* (2013.01)

(58) Field of Classification Search
  CPC . B60K 17/04; F02N 11/0803; F02N 11/0844; F02N 2200/101; F02N 2200/102; F02N 2200/022; F02N 2200/602; Y02T 10/40; Y02T 10/60; B60W 2540/10; B60W 2540/12; B60W 2510/0638; B60W 30/18072; B60W 30/18109; B60W 10/026; B60W 10/02; B60W 10/06
  USPC ....... 123/179.3, 179.4, 179.25; 701/112, 113
  See application file for complete search history.

(56) References Cited

U.S. PATENT DOCUMENTS

| | | | |
|---|---|---|---|
| 10,525,967 B2 * | 1/2020 | Pietron | ................ B60W 30/20 |
| 2019/0040947 A1 | 2/2019 | Oota et al. | |

FOREIGN PATENT DOCUMENTS

| | | |
|---|---|---|
| JP | 2013-043572 A | 3/2013 |
| JP | 2015-205526 A | 11/2015 |
| JP | 2016-114037 A | 6/2016 |
| JP | 2017-137945 A | 8/2017 |

* cited by examiner

INTERNAL COMBUSTION ENGINE CONTROL METHOD AND INTERNAL COMBUSTION ENGINE CONTROL DEVICE

FIELD OF THE INVENTION

The present invention relates to a control method for an internal combustion engine and a control device for an internal combustion engine.

BACKGROUND ART

There is conventionally known a technique of automatically stopping an internal combustion engine upon satisfaction of a predetermined automatic stop condition by e.g. a driver's accelerator release operation or brake depression operation.

Patent Document 1 discloses a technique of, when a restart request or start request is inputted by a driver during automatic stop of an internal combustion engine, judging or predicting a swing-back of the internal combustion engine and then restarting the internal combustion engine in consideration of the swing-back of the internal combustion engine.

In Patent Document 1, the internal combustion engine is restarted by performing cranking with a starter at the timing that that the internal combustion engine rotates forward and by performing fuel injection and ignition at the timings calculated under early restart control.

In a state that the rotation speed of the internal combustion engine is at a certain high level, the internal combustion engine can be restarted only by restarting fuel supply.

In general, the internal combustion engine can be restarted more quickly only by restarting fuel supply than by restarting fuel supply along with performing cranking.

Furthermore, the rotation speed of the internal combustion engine decreases with fluctuations when the internal combustion engine is automatically stopped during running.

For this reason, the lower limit of the engine rotation speed at which the internal combustion engine can be restarted only by restarting fuel supply (that is so-called "fuel-cut recovery rotation speed") is set lower as the degree of fluctuations of the engine rotation speed is smaller.

In Patent Document 1, however, no consideration is given to the fluctuations of the engine rotation speed at the time of restart of the automatically stopped internal combustion engine.

There is therefore a room for further improvement in the technique of restarting the automatically stopped internal combustion engine quickly as soon as possible.

Incidentally, the greater the moment of inertia acting on the part rotated together with the crankshaft of the internal combustion engine, the smaller the fluctuations of the rotation speed of the internal combustion engine.

PRIOR ART DOCUMENTS

Patent Document

Patent Document 1: Japanese Laid-Open Patent Publication No. 2016-114037

SUMMARY OF THE INVENTION

The present invention refers to control of an internal combustion engine as a driving source of a vehicle, comprising: restarting fuel supply to the internal combustion engine which has been automatically stopped during running of the vehicle, wherein, when a rotation speed of the internal combustion engine is lower than a predetermined first rotation speed, cranking of the internal combustion engine is performed at the time of restarting the fuel supply to the internal combustion engine; and wherein the first rotation speed is set lower in a state that a lock-up clutch of a torque converter arranged between the internal combustion engine and a transmission is engaged than in a state that the lock-up clutch of the torque converter is released.

According to the present invention, the internal combustion engine is restarted quickly in consideration of fluctuations of the engine rotation speed when a request for restart of the internal combustion engine is inputted under the situation that the fuel supply has been automatically stopped.

DESCRIPTION OF EMBODIMENTS

Hereinafter, one embodiment of the present invention will be described in detail below with reference to the drawings.

Figure 1:
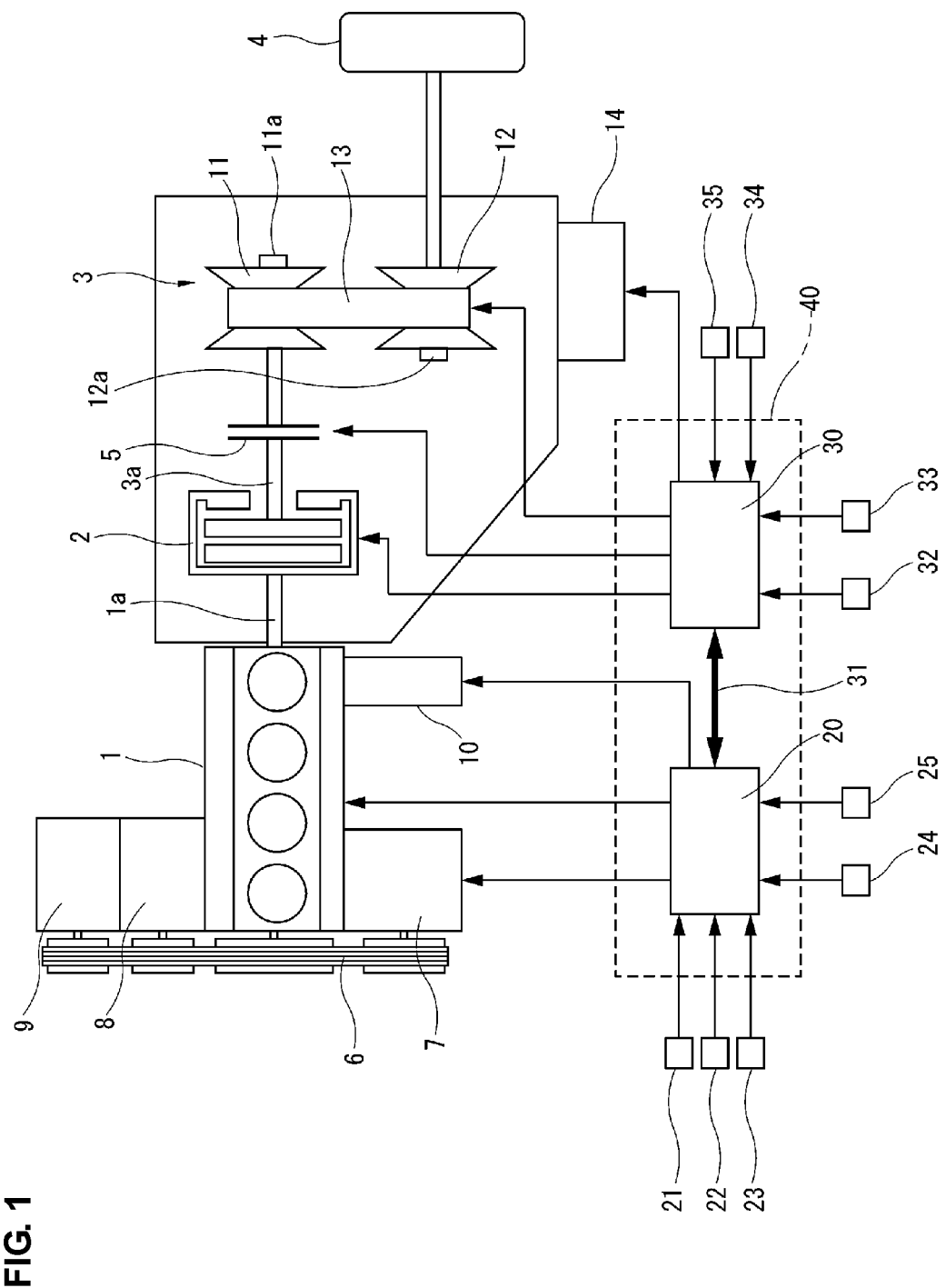
FIG. 1 is a schematic configuration diagram of a control device for an internal combustion engine according to one embodiment of the present invention.

FIG. 1 is a schematic configuration diagram of a control device for an internal combustion engine 1 according to one embodiment of the present invention.

The internal combustion engine 1 is provided as a driving source of a vehicle. A CVT (continuously variable transmission) 3 as a transmission is connected to the internal combustion engine 1 through a torque converter 2 with a lock-up mechanism.

As the lock-up mechanism, a mechanical clutch is built in the torque converter 2. The lock-up mechanism allows connection between the internal combustion engine 1 and the CVT 3 through the torque converter 2 by release of the lock-up clutch. Further, the lock-up mechanism allows direct connection between an output shaft 1a of the internal combustion engine 1 and an input shaft 3a of the CVT by engagement of the lock-up clutch. In this lock-up mechanism, the engagement/slip engagement/release of the lock-up clutch is controlled by means of a LU actual hydraulic pressure, which is generated according to a LU command pressure from the after-mentioned TCU 30.

The CVT 3 is provided to transmit power to driving wheels 4 of the vehicle through a final reduction gear (not shown) as in ordinary vehicles. In the present embodiment, a forward clutch 5 is arranged between the torque converter 2 and the CVT 3.

Accordingly, the internal combustion engine 1, the torque converter 2, the forward clutch 5, the CVT 3 and the vehicle driving wheels 4 are arranged in series in this order on the power transmission path for transmission of power of the internal combustion engine 1 to the vehicle driving wheels 4.

A motor 7, a water pump 8 and an air conditioner compressor 9 are arranged to be drivable by the internal combustion engine 1 through a belt 6.

The motor 7 is of the type which applies a driving force to the internal combustion engine 1 or generates electric power.

A starter motor 10 is arranged on the internal combustion engine 1, separately from the motor 7, so as to assist in starting the internal combustion engine 1. In the case of using the motor 7 for starting of the internal combustion engine 1, the starter motor 10 can be omitted.

The CVT 3 has a primary pulley 11, a secondary pulley 12 and a V-belt 13 wound on V-grooves of the primary and secondary pulleys 11 and 12. The primary pulley 11 is provided with a primary hydraulic cylinder 11a, whereas the secondary pulley 12 is provided with a secondary hydraulic cylinder 12a. The width of the V-groove of the primary pulley 11 is changed by adjusting the hydraulic pressure supplied to the primary hydraulic cylinder 11a. Similarly, the width of the V-groove of the secondary pulley 12 is changed by adjusting the hydraulic pressure supplied to the secondary hydraulic cylinder 12a.

The radius of contact of the V-belt 13 with the primary and secondary pulleys 11 and 12 changes with changes in the widths of the respective V-grooves by controlling the hydraulic pressures supplied to the primary and secondary hydraulic cylinders 11a and 12a. With such change in contact radius, the transmission ratio of the CVT 3 is varied in a continuous, stepless manner.

To the CVT 3, hydraulic oil is supplied from a mechanical oil pump (not shown) as a first pump drivable by the internal combustion engine 1 and an electric oil pump 14 as a second pump. More specifically, the hydraulic pressure is supplied from the mechanical oil pump or electric oil pump 14 to each of the first and second hydraulic cylinders 11a and 12a. The electric oil pump 14 is driven when the internal combustion engine 1 is automatically stopped by idle stop control etc. In other words, the electric oil pump 14 is driven during stop of the mechanical oil pump.

The hydraulic oil from the mechanical oil pump or electric oil pump 14 is also supplied to the torque converter 2 and to the forward clutch 5. Hence, the mechanical oil pump or electric oil pump 14 also serves as a source of hydraulic oil supply to the torque converter 2 and the forward clutch 5.

The forward clutch 5 corresponds to a clutch arranged between the internal combustion engine 1 and the vehicle driving wheels 4 and serves to, when released, disconnect the internal combustion engine 1 and the CVT 3 from each other. The forward clutch 5 is mounted to the CVT input shaft 3a, and is operable in an engaged state to allow power transmission between the internal combustion engine 1 and the vehicle driving wheels 4 and in a released state to disable power (torque) transmission between the internal combustion engine 1 and the vehicle driving wheels 4. That is to say, the internal combustion engine 1 is disconnected from the vehicle driving wheels 4 by release of the forward clutch 5. To be more specific, the internal combustion engine 1 is disconnected from the CVT 3 by release of the forward clutch 5 in the present embodiment.

The internal combustion engine 1 is controlled by an ECU (engine control unit) 20. In the present embodiment, the ECU 20 is constituted by a known type of digital computer with a CPU, A ROM, RAM and an input/output interface.

The ECU 20 receives inputs of detection signals from various sensors including: a crack angle sensor 21 that detects a crank angle of a crankshaft (not shown) of the internal combustion engine 1; an accelerator opening sensor 22 that detects a depression amount of an accelerator pedal (not shown) of the vehicle; a brake switch 23 that detects an operation of a brake pedal (not shown) of the vehicle; a vehicle speed sensor 24 that detects a running speed of the vehicle; and an acceleration sensor 25 that detects an inclination of the vehicle in a forward or backward direction. The crank angle sensor 21 serves to detect a rotation speed of the internal combustion engine 1.

Based on the detection signals from these various sensors, the ECU 20 optimally controls the amount and timing of fuel injection by a fuel injection valve (not shown) of the internal combustion engine 1 and the ignition timing and intake air amount of the internal combustion engine 1. The ECU 20 also optimally controls operations of the motor 7 and the starter motor 10.

The ECU 20 further receives an input of information about the SOC of a battery mounted to the vehicle and the like.

On the other hand, the CVT 3 is controlled by a TCU (transmission control unit) 30. The TCU 30 is constituted by a known type of digital computer with a CPU, A ROM, RAM and an input/output interface in the present embodiment.

The ECU 20 and the CTU 30 are connected to each other by a CAN communication line 31 so that data transmission can be performed between the ECU 20 and the CTU 30 through the CAN communication line 31.

The TCU 30 receives inputs of detection signals from the above-mentioned accelerator opening sensor 22, brake switch 23 and vehicle speed sensor 24 through the CAN communication line 31.

The TCU 30 further receives inputs of detection signals from various sensors including: a primary rotation speed sensor 32 that detects a rotation speed of the primary pulley 11 as an input rotation speed of the CVT 3; a secondary rotation speed sensor 33 that detects a rotation speed of the secondary pulley 12 as an output rotation speed of the CVT 3; a hydraulic pressure sensor 34 that detects the hydraulic pressure of the hydraulic oil supplied to the CVT 3; and an inhibitor switch 35 that detects a position of a selector lever for selecting a running range of the vehicle.

Based on the detection signals from these various sensors, the TCU 30 optimally controls the transmission ratio of the CVT 3 and operations of the torque converter 2 and the forward clutch 5. The TCU 30 also performs drive control of the electric oil pump 14.

When a predetermined internal combustion engine stop condition is satisfied during running of the vehicle, the internal combustion engine 1 is automatically stopped with the stop of fuel supply. When a restart request is inputted during automatic stop of the internal combustion engine 1, the internal combustion engine 1 is restarted with the restart of fuel supply.

Figure 2:
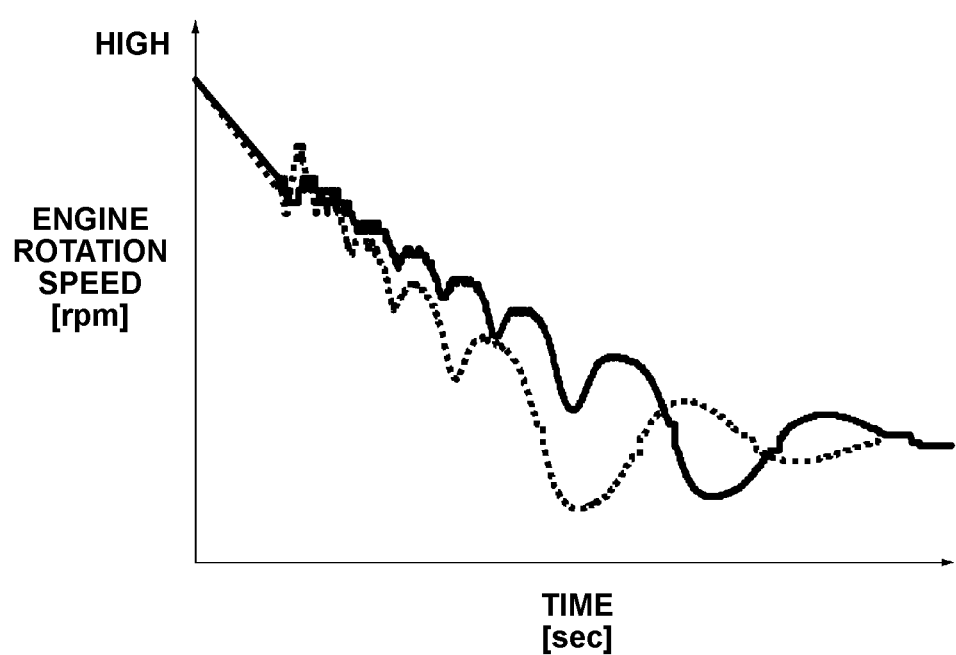
FIG. 2 is an illustration showing fluctuations of engine rotation speed in the case where the internal combustion engine is automatically stopped during running.

FIG. 2 is an illustration showing fluctuations of the engine rotation speed in the case where the internal combustion engine 1 is automatically stopped during running of the vehicle.

In FIG. 2, a solid line indicates fluctuations of the engine rotation speed in a sailing stop state.

In the present embodiment, the sailing stop state is defined as the state in which the internal combustion engine 1 is automatically stopped during coasting of the vehicle in a middle-to-high vehicle speed range with the brake pedal undepressed (i.e. the brake switch 23 in OFF position). In the sailing stop state, the forward clutch 5 is released; the lock-up clutch of the lock-up mechanism of the torque converter 2 is engaged.

In FIG. 2, a broken line indicates fluctuations of the engine rotation speed in a coast stop state.

In the present embodiment, the coast stop state is defined as the state in which the internal combustion engine 1 is automatically stopped during deceleration of the vehicle, with the brake pedal depressed (i.e. the brake switch 23 in ON position), in a low vehicle speed range. In the coast stop state, the forward clutch 5 is engaged; and the lock-up clutch of the lock-up mechanism of the torque converter 2 is released.

In the case where the lock-up clutch is released, the crankshaft of the internal combustion engine 1 rotates in synchronism with a pump impeller (not shown) of the torque converter 2.

In the case where the lock-up clutch is engaged, the crankshaft of the internal combustion engine 1 rotates in synchronism with the pump impeller (not shown) and a turbine runner (not shown) of the torque converter 2.

The moment of inertia is thus increased by the amount of rotation of the turbine runner in the sailing stop state in which the lock-up clutch is engaged. Consequently, the moment of inertia becomes greater in the sailing stop state than in the coast stop state so that the degree of rotational fluctuations of the internal combustion engine 1 caused by a compression reaction force and expansion force becomes relatively small in the sailing stop state as shown in FIG. 2.

Furthermore, combustion recovery starting in which the internal combustion engine 1 is started only by restarting fuel supply leads to a quick restart of the internal combustion engine 1 as compared to cranking recovery starting in which the internal combustion engine 1 is started by restarting fuel supply along with performing cranking.

In view of these facts, the present embodiment is configured as follows. In the case of restarting the internal combustion engine 1 which has been automatically stopped during running of the vehicle, the internal combustion engine 1 is restarted by the combustion recovery starting when the rotation speed of the internal combustion engine 1 under the input of the restart request is higher than or equal to a predetermined first rotation speed. In the case of restarting the internal combustion engine 1 which has been automatically stopped during running of the vehicle, the internal combustion engine 1 is restarted by the cranking recovery starting when the rotation speed of the internal combustion engine 1 under the input of the restart request is lower than the predetermined first rotation speed. In the cranking recovery starting, the cranking of the internal combustion engine is performed by the motor 7.

In the present embodiment, the ECU 20 and the TCU 30 are cooperative with each other. These two control units are hence regarded as one CU (control unit) 40. Thus, the CU 40 including the ECU 20 and the TCU 30 corresponds to a control unit that, when the rotation speed of the internal combustion engine 1 is lower than the first rotation speed, performs cranking of the internal combustion engine 1 at the time of restarting the fuel supply to the internal combustion engine 1 in the automatically stopped state.

The first rotation speed is a fuel-cut recovery rotation speed, that is, the lower limit of the engine rotation speed at which the internal combustion engine 1 can be restarted by only restarting the fuel supply. The first rotation speed is set according to the operating state.

More specifically, the first rotation speed is set lower in consideration of fluctuations of the engine rotation speed at the restart of the internal combustion engine 1 in the sailing stop state than at the restart of the internal combustion engine 1 in the coast stop state. In other words, the fuel-cut recovery rotation speed at the restart of the internal combustion engine 1 in the sailing stop state where the degree of fluctuations of the engine rotation speed is relatively small is set lower than the fuel-cut recovery rotation speed at the restart of the internal combustion engine 1 in the coast stop state.

That is to say, the range of the engine rotation speed in which the internal combustion engine 1 is restartable by the combustion recovery starting is enlarged at the restart of the internal combustion engine 1 in the sailing stop state.

Furthermore, the range of the engine rotation speed in which the internal combustion engine 1 is restartable by the combustion recovery starting is varied by changing the first rotation speed depending on whether the lock-up clutch of the lock-up mechanism of the torque converter 2 is engaged or released.

Herein, the restart of the internal combustion engine 1 in the sailing stop state corresponds to a first restart; and the restart of the internal combustion engine 1 in the coast stop state corresponds to a second restart.

In the present embodiment, the first rotation speed at the restart of the internal combustion engine 1 in the sailing stop state is set to e.g. 350 rpm; and the first rotation speed at the restart of the internal combustion engine 1 in the coast stop state is set to e.g. 500 rpm.

The above-mentioned control enables, when a request for restart of the internal combustion engine 1 is inputted under the situation that the fuel supply to the internal combustion engine 1 has been automatically stopped, restarting of the internal combustion engine 1 quickly as soon as possible in consideration of fluctuations of the engine rotation speed.

For example, when a request for acceleration of the vehicle is inputted under the situation that the fuel supply to the internal combustion engine 1 has been automatically stopped, the vehicle is quickly accelerated by quick restarting of the internal combustion engine 1 according to the operating state.

In addition, there is omitted unnecessary cranking at the restart of the internal combustion engine 1 by changing the first rotation speed according to the state of the lock-up clutch.

Figure 3:
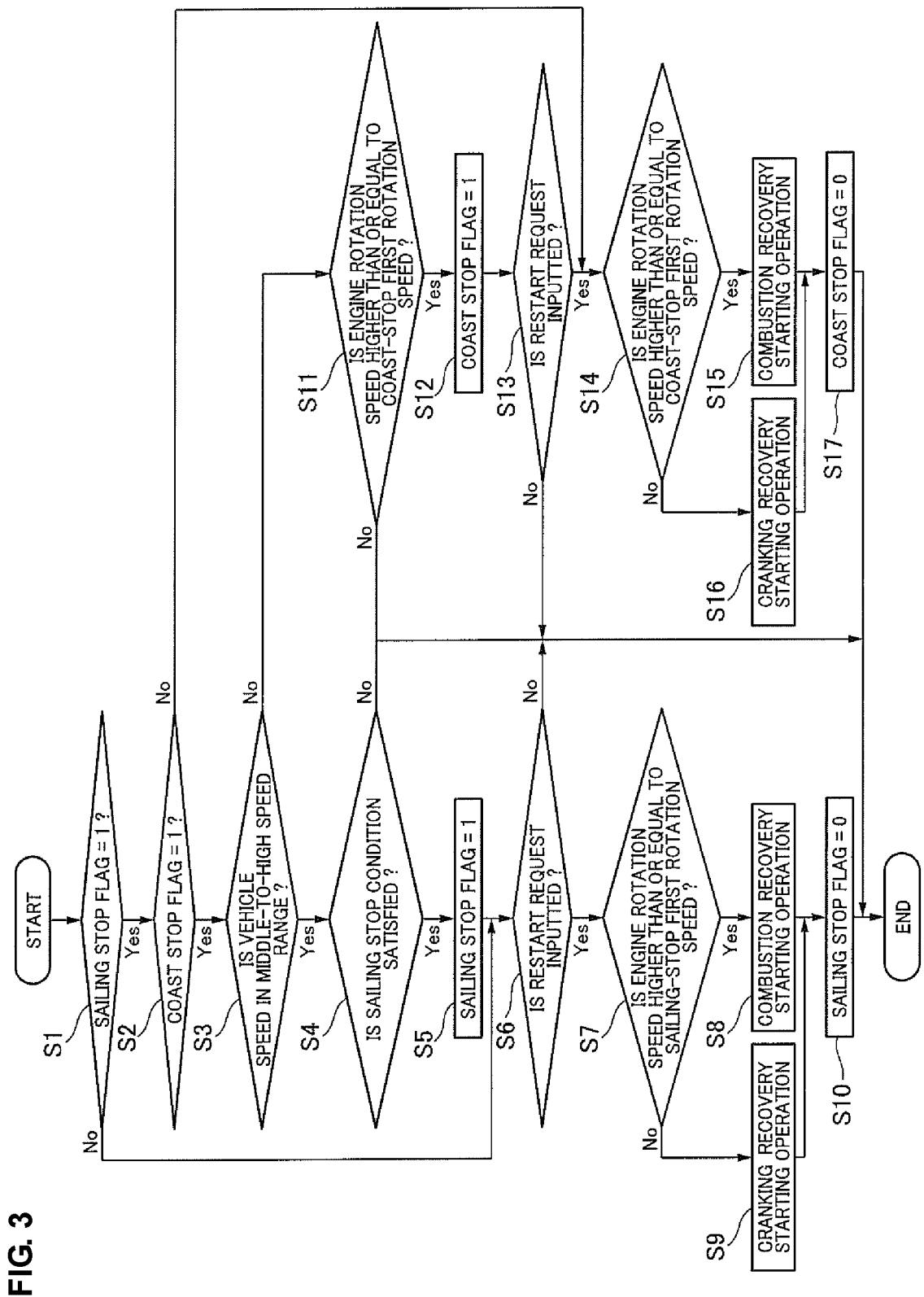
FIG. 3 is a flowchart of a method for control of the internal combustion engine according to one embodiment of the present invention.

FIG. 3 is a flowchart of a routine for the control of the internal combustion engine in the present embodiment. This control routine is repeatedly executed by the CU 40 at predetermined time intervals (of e.g. 10 ms).

In step S1, it is judged whether the sailing stop flag is set to "1". When the sailing stop flag is judged as "1" in step S1, the control proceeds to step S6. When the sailing stop flag is judged as "0" in step S1, the control proceeds to step S2.

In step S2, it is judged whether the coast stop flag is set to "1". When the coast stop flag is judged as "1" in step S2, the control proceeds to step S13. When the coast stop flag is judged as "0" in step S2, the control proceeds to step S3.

In step S3, it is judged whether the speed of the vehicle during running is in a middle-to-high speed range. In other words, it is judged whether the vehicle running speed is at a level where the lock-up clutch of the lock-up mechanism of the torque converter 2 is engaged. More specifically, it is judged whether the vehicle running speed is higher than or equal to e.g. 15 km/h in the present embodiment. The lock-up clutch of the lock-up mechanism of the torque converter 2 is engaged when the vehicle is in a middle-to-high speed running state. When the vehicle is in a low-speed running state, the lock-up clutch of the lock-up mechanism of the torque converter 2 is released.

When the vehicle running speed is judged as being in the middle-to-high speed range, i.e., judged as being higher than or equal to e.g. 15 km/h in step S3, the control proceeds to step S4. The control proceeds to step S11 when the vehicle running speed is judged as not being in the middle-to-high speed range, i.e., judged as being lower than e.g. 15 km/h in step S3.

In step S4, it is judged whether a condition for sailing stop of the vehicle, that is called a "sailing stop condition", is satisfied. The sailing stop condition corresponds to an internal combustion engine automatic stop condition.

The sailing stop condition is satisfied e.g. in the case where the accelerator pedal is changed from a depressed position (i.e. accelerator ON state) to an undepressed position (i.e. released position; accelerator OFF state) during running of the vehicle and, at the same time, the SOC of the battery is higher than or equal to a predetermined value. In other words, the sailing stop condition is satisfied in the case where there is no request for driving power.

When it is judged that the sailing stop condition is satisfied in step S4, the fuel supply to the internal combustion engine 1 is stopped; and the forward clutch 5 is released. Then, the control proceeds to step S5. When it is judged that the sailing stop condition is not satisfied in step S4, the control exits from the current routine.

In step S5, the sailing stop flag is set to "1".

In step S6, it is judged whether there is inputted a request for restart of the internal combustion engine 1. It is judged that the restart request is inputted in the case where the accelerator pedal is in a depressed position (accelerator ON state) or in the case where it is necessary to secure electric power for the vehicle due to the reason that the SOC of the battery becomes lower than the predetermined value etc. When it is judged in step S6 that the restart request is inputted, the control proceeds to step S7. When it is judged in step S6 that the restart request is not inputted, the control exits from the current routine.

In step S7, it is judged whether the current rotation speed of the internal combustion engine 1 is higher than or equal to a predetermined sailing-stop first rotation speed. The sailing-stop first rotation speed, which corresponds to the first rotation speed, is set to a value lower than the aftermentioned coast-stop first rotation speed. In the present embodiment, the sailing-stop first rotation speed is set to a value of e.g. about 350 rpm.

When the current engine rotation speed is judged as higher than or equal to the sailing-stop first rotation speed in step S7, the control proceeds to step S8. When the current engine rotation speed is judged as lower than the sailing-stop first rotation speed in step S7, the control proceeds to step S9.

In step S8, the internal combustion engine 1 is restarted by the combustion recovery starting. The control then proceeds to step S10.

In step S9, the internal combustion engine 1 is restarted by the cranking recovery starting. The control then proceeds to step S10.

In step S10, the sailing stop flag is set to "0".

In step S11, it is judged whether a condition for coast stop of the vehicle, that is called a "coast stop condition", is satisfied. The coast stop condition also corresponds to an internal combustion engine automatic stop condition.

The coast stop condition is satisfied e.g. in the case where the SOC of the battery is higher than or equal to a predetermined value during deceleration of the vehicle with the brake pedal depressed (i.e. the brake switch 23 in ON position).

When it is judged that the coast stop condition is satisfied in step S11, the fuel supply to the internal combustion engine 1 is stopped; and the forward clutch 5 is engaged. Then, the control proceeds to step S12. When it is judged that the coast stop condition is not satisfied in step S11, the control exits from the current routine.

In step S12, the coast stop flag is set to "1".

In step S13, it is judged whether there is inputted a request for restart of the internal combustion engine 1. It is judged that the restart request is inputted in the case where the accelerator pedal is in a depressed position (accelerator ON state), in the case where the brake pedal is changed to an undepressed position (i.e. the brake switch 23 is turned to OFF position) or in the case where it is necessary to secure electric power for the vehicle due to the reason that the SOC of the battery becomes lower than the predetermined value etc. When it is judged in step S13 that the restart request is inputted, the control proceeds to step S14. When it is judged in step S13 that the restart request is not inputted, the control exits from the current routine.

In step S14, it is judged whether the current rotation speed of the internal combustion engine 1 is higher than or equal to a predetermined coast-stop first rotation speed. The coast-stop first rotation speed, which also corresponds to the first rotation speed, is set to a value higher than the sailing-stop first rotation speed. In the present embodiment, the coast-stop first rotation speed is set to a value of e.g. about 500 rpm.

When the current engine rotation speed is judged as higher than or equal to the coast-stop first rotation speed in step S14, the control proceeds to step S15. When the current engine rotation speed is judged as lower than the coast-stop first rotation speed in step S14, the control proceeds to step S16.

In step S15, the internal combustion engine 1 is restarted by the combustion recovery starting. The control then proceeds to step S17.

In step S16, the internal combustion engine 1 is restarted by the cranking recovery starting. The control then proceeds to step S17.

In step S17, the coast stop flag is set to "0".

Although the continuously variable transmission is used as the transmission in the above-mentioned embodiment, the present invention is applicable to even a vehicle with a stepped automatic transmission.

Furthermore, the above-mentioned embodiment is directed to the control method and device for the internal combustion engine.

The invention claimed is:

1. A control method for an internal combustion engine as a driving source of a vehicle, comprising: restarting fuel supply to the internal combustion engine which has been automatically stopped during running of the vehicle,
    wherein, when a rotation speed of the internal combustion engine is lower than a predetermined first rotation speed, cranking of the internal combustion engine is performed at the time of restarting the fuel supply to the internal combustion engine, and
    wherein the first rotation speed is set lower in a state that a lock-up clutch of a torque converter arranged between the internal combustion engine and a transmission is engaged than in a state that the lock-up clutch of the torque converter is released.

2. The control method for the internal combustion engine according to claim 1,
    wherein the first rotation speed is set lower at a first restart in which the fuel supply to the internal combustion engine is restarted from a state that: an accelerator pedal of the vehicle is undepressed; a clutch arranged between the lock-up clutch and driving wheels of the vehicle is released; and the lock-up clutch is engaged, than at a second restart in which the fuel supply to the internal combustion engine is restarted from a state that: a brake pedal of the vehicle is depressed; the clutch is engaged; and the lock-up clutch is released.

3. The control method for the internal combustion engine according to claim 2,
wherein the clutch is released in the first restart.

4. A control device for an internal combustion engine,
the internal combustion engine being provided as a driving source of a vehicle,
the vehicle comprising a transmission and a torque converter arranged between the internal combustion engine and the transmission,
the control device comprising a control unit that restarts fuel supply to the internal combustion engine which has been automatically stopped upon satisfaction of a predetermined condition during running of the vehicle,
wherein, when a rotation speed of the internal combustion engine is lower than a predetermined first rotation speed, the control device performs cranking of the internal combustion engine at the time of restarting the fuel supply to the internal combustion engine, and
wherein the first rotation speed is set lower in a state where a lock-up clutch of the torque converter is engaged than in a state where the lock-up clutch of the torque converter is released.

* * * * *